(12) United States Patent  (10) Patent No.: US 8,768,747 B2
Southam et al.  (45) Date of Patent: Jul. 1, 2014

(54) SYSTEM FOR TRANSMITTING SYNDICATED PROGRAMS OVER THE INTERNET

(75) Inventors: Adam G. Southam, Edina, MN (US); Jeffrey Sven Gustafson, Eden Prairie, MN (US)

(73) Assignee: Syndicast Corporation, Eden Prairie, MN (US)

( * ) Notice: Subject to any disclaimer, the term of this patent is extended or adjusted under 35 U.S.C. 154(b) by 1123 days.

(21) Appl. No.: 12/013,364

(22) Filed: Jan. 11, 2008

(65) Prior Publication Data

US 2008/0319828 A1  Dec. 25, 2008

Related U.S. Application Data

(63) Continuation of application No. 09/659,664, filed on Sep. 12, 2000, now abandoned.

(51) Int. Cl.
*G06Q 30/02*  (2012.01)
(52) U.S. Cl.
USPC ..................... 705/7.34; 705/14.66
(58) Field of Classification Search
CPC ............... G06Q 30/0205; G06Q 30/0269
USPC ........................... 705/7.34, 14.66
See application file for complete search history.

(56) References Cited

U.S. PATENT DOCUMENTS

| | | | |
|---|---|---|---|
| 5,721,827 A | 2/1998 | Logan et al. | |
| 5,892,900 A | 4/1999 | Ginter et al. | |
| 6,463,585 B1 | 10/2002 | Hendricks et al. | |
| 6,519,571 B1 * | 2/2003 | Guheen et al. | 705/14.66 |
| 6,665,517 B2 | 12/2003 | Brennan et al. | |
| 7,146,329 B2 * | 12/2006 | Conkwright et al. | 705/14.66 |

OTHER PUBLICATIONS

"Internet Distributors signs international syndication agreement with IEEE Network", PR Newswire, p. 0121LAW064, Jan. 21, 1998.

(Continued)

*Primary Examiner* — Donald L. Champagne
(74) *Attorney, Agent, or Firm* — Winthrop & Weinstine, P.A.

(57) ABSTRACT

A system and method are provided for exposing Internet users to advertisements together with the distribution of media content in a manner which is germane to conventional syndicated broadcast agreements. The system includes a processor coupled to a memory device. The system further includes software means operable on the processor and memory device. The software means is operable on the processor for obtaining a user specific set of data prior to distributing a media package. The software means is operable for selecting a number of advertisements from a data bank containing a plurality of advertisements based on the user specific set of data. The software means is operable for combining the selected number of advertisements with a requested set of media content to form the media package. The software means is further operable for distributing the media package. In this manner a regional broadcasting station can preserve its investment in purchasing national syndicate broadcast rights by ensuring regional advertisers a penetration of their advertisements across a regional Internet audience. Methods for performing the same are similarly included.

52 Claims, 10 Drawing Sheets

(56) References Cited

OTHER PUBLICATIONS

"Pennzoil sponsors Auto Channel site", Promo, v. IX, n. 4, p. 156, Mar. 1996.

"Looksmart announces plans to bring talk radio to the Internet", Business Wire, 08:45 EDT, May 12, 1999.

"The Rush Limbaugh Show debuts on the Internet", PR Newswire, 09:47 EST, Mar. 1, 1999.

Shaw, Russell, "Courting the Web: Judge Judy will be available Fridays on WebTV", Electronic Media, p. 22(1), Mar. 29, 1999.

"First Entertainment's wholly owned radio subsidiary, Quality Communications, agrees to Internet broadcast with BroadcastMusic.com", Business Wire, Apr. 19, 1999.

"Interactive Channel adds Cyber Radio to LocalSource", PR Newswire, p. 6483, Nov. 19, 1998.

* cited by examiner

SYSTEM FOR TRANSMITTING SYNDICATED PROGRAMS OVER THE INTERNET

BACKGROUND OF THE INVENTION

Many national television and radio programs are distributed to local broadcasting stations through an arrangement of syndication in the form of either live or recorded feeds. These feeds include program content with breaks for the insertion of local commercials, news highlights, station identification or other localized information. Under the syndication arrangement, the local television and radio stations purchase the national program content and may broadcast, or re-broadcast the program feed with inserted localized content to an agreed upon geographic area.

Syndication agreements are founded on a simple principle: National content produced or hosted by entertainment industry superstars attract large audiences. Local stations do not have the resources to hire superstars and produce high-budget shows on their own so syndicators produce the big name shows and resell the feed, or content, to local stations for broadcast to an agreed upon geographic area. Local stations, in turn, purchase this content with the intent of attracting a large audience, which attracts a large base of advertisers, which creates a revenue stream to recoup the original cost of purchasing the syndicated content. To protect the purchaser's investment, syndicated shows are necessarily licensed to only one broadcaster in any given geographic market.

This principle does not apply to nationally televised programs, such as the Olympic Games, because the sponsors are advertising nationally. In other words, a viewer in Los Angeles will see the same commercials as a viewer in New York.

As technology progresses and media content distribution moves from traditional analog, radio frequency based broadcasts, to a digital, and inevitably, Internet based broadcast schemes, there is a need for allowing syndicated television and radio shows to be transmitted via the Internet while protecting the interests of the local stations purchasing syndicated content. The strength of a radio or television broadcast currently serves as an automatic enforcer of syndication agreements. Unlike Internet broadcast and distribution technology, radio and television signals have a range limited by output power and topography. The ever-increasing power of the Internet as a tool for distributing both audible and visual information is a strong catalyst for the inevitable convergence of the traditional television with the personal computer.

For many reasons, syndicated feeds may not be available to certain audiences: rural broadcasters may not be able to justify the cost of the feeds to a limited audience and advertiser base, remote locations may fall outside of the broadcasting range of the nearest station, or local stations may have simply chosen not to carry the syndicated feed. Recent legislation, which mirrors rural electrification acts of the 50's, coupled with advancements in communication technology, have made the Internet available in even the most rural areas of the US. This availability has created a media distribution network capable of filling in the gaps left by traditional broadcast technology.

Providing access to radio and television shows on the Internet, therefore, would likely increase the size of a syndicated show audience beyond that of the existing, traditional audience. Thus, there is a need to integrate national advertisements, featured in conventional original broadcasts, into potential Internet transmissions of the same syndicated transmissions. There is also the need for the creation of a currently non-existent market for local advertisers to a currently unreachable audience.

SUMMARY OF THE INVENTION

The present invention includes a novel system for allowing syndicated television and radio shows to be transmitted over the Internet while protecting the interests of the local advertisers. This need is readily apparent in situations where a show is not available via traditional broadcasts or when a viewer would simply prefer to view the broadcast through computer-based Internet connected technology.

One embodiment of the present includes a system for exposing Internet users to advertisements together with the distribution of media content in a manner which is germane to conventional syndicated broadcast agreements. The system includes a processor coupled to a memory device. The system further includes software means operable on the processor and memory device. The software means is operable on the processor for obtaining a user specific set of data prior to distributing a media package to an Internet user. The software means is operable for selecting a number of advertisements from a data bank containing a plurality of advertisements, based on the user specific set of data. The software means is operable for combining the selected number of advertisements with a requested set of media content to form the media package. The software means is further operable for distributing the media package to the Internet user. In this manner a regional broadcasting station can preserve its investment in purchasing syndicated broadcast rights by ensuring preservation of its regional advertisement distributor area. Methods for performing the same are similarly included.

Using the present invention, syndicated television and radio programs may be transmitted to areas not presently within the coverage area of local stations carrying syndicated programs. Local stations will be given the opportunity to broaden their coverage areas. Additionally, remote areas will be able to receive such syndicated programs regardless of whether local stations are present. Furthermore, the present invention will allow syndicated programs to be transmitted through mediums other than conventional television and radio channels.

These and other objectives and advantages of the invention will appear more fully from the following description, made in conjunction with the accompanying drawings wherein like reference characters refer to the same or similar parts throughout the several views. And, although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

DETAILED DESCRIPTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
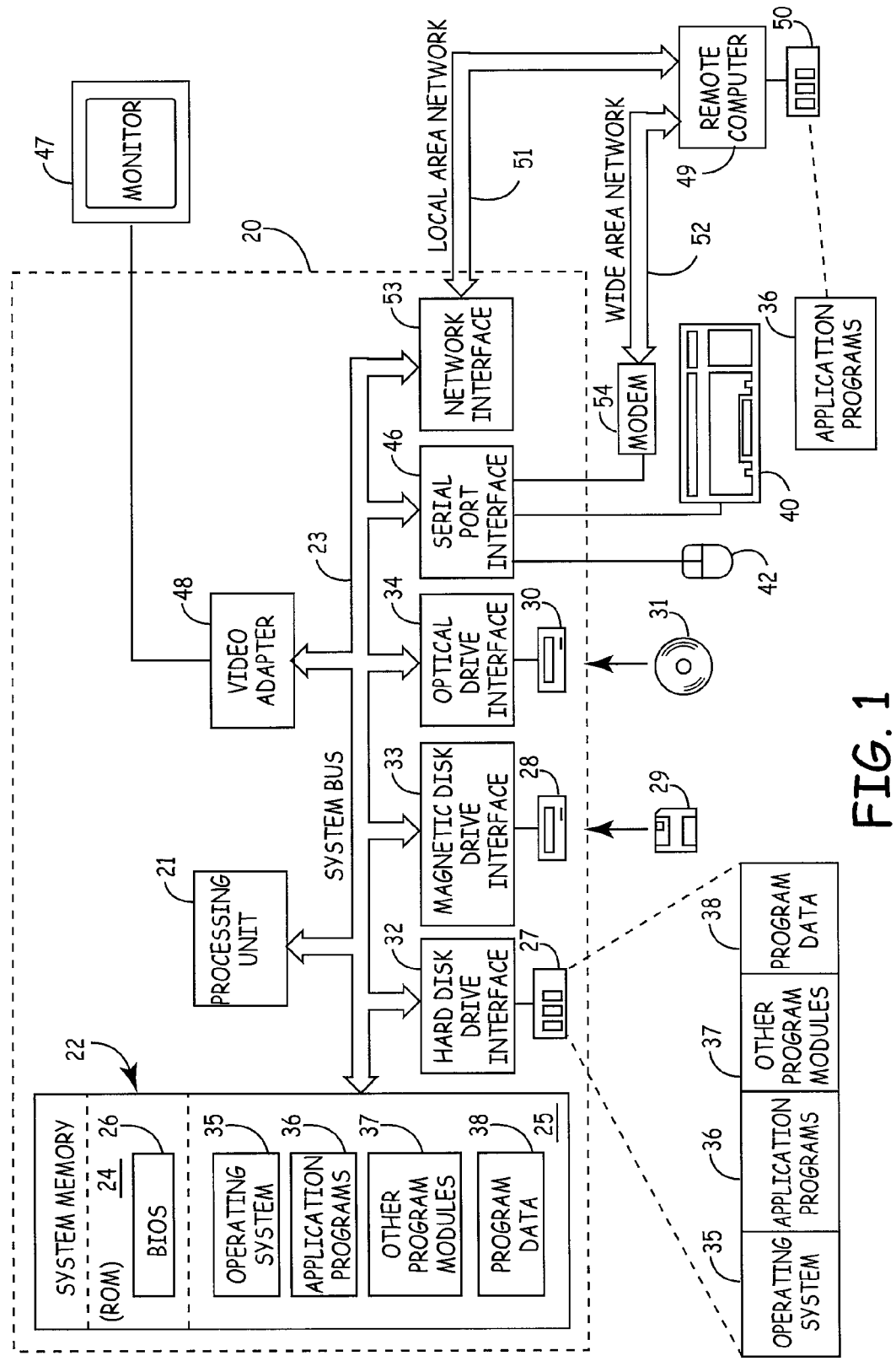
FIG. 1 is a block diagram of the hardware and operating environment of a suitable computer in conjunction with which embodiments of the invention may be practiced.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers. In one embodiment, one or more speakers 57 or other audio output transducers are driven by sound adapter 56 connected to system bus 23.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Figure 2:
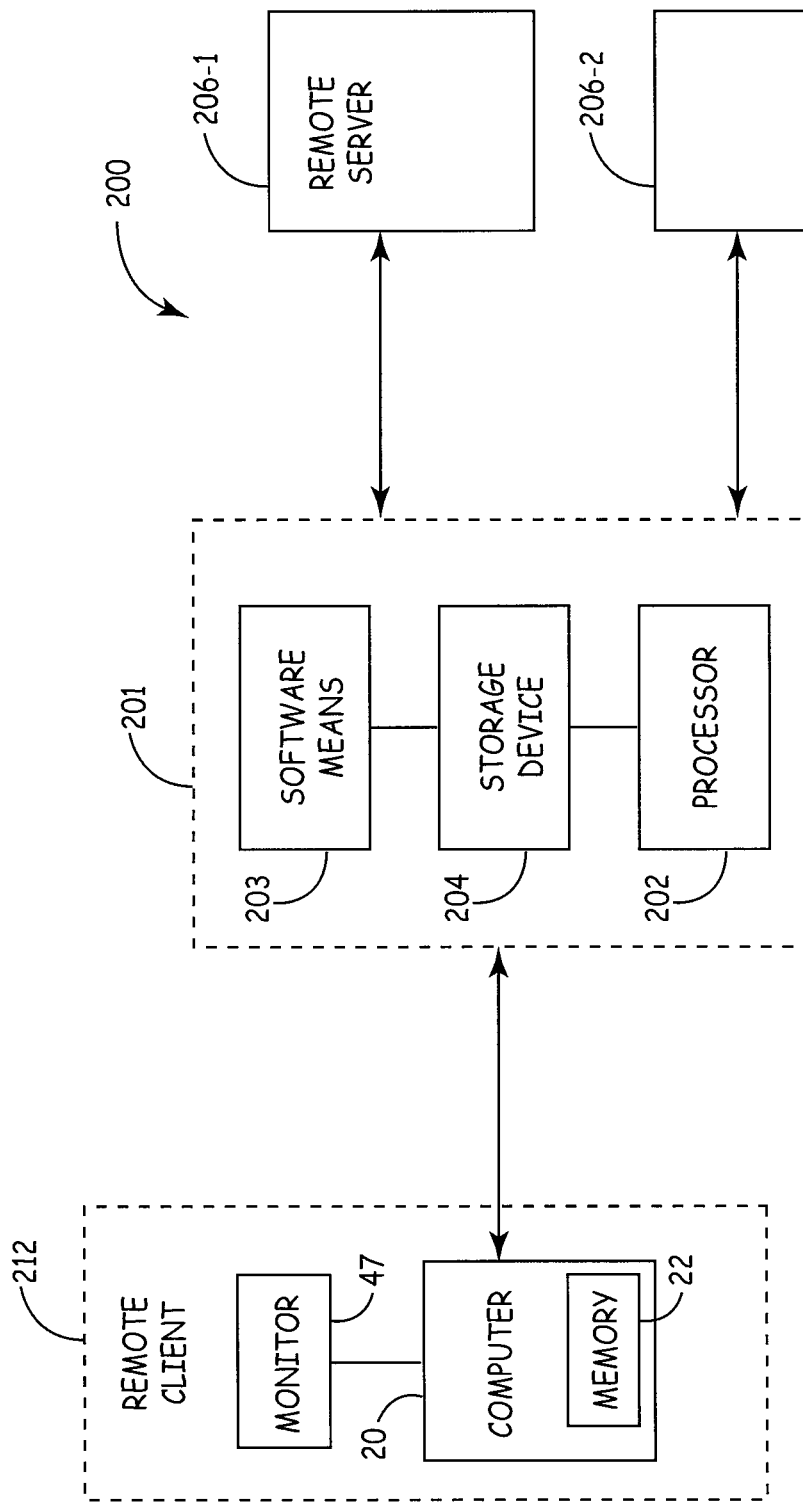
FIG. 2 illustrates a system embodiment according to the teachings of the present invention.

FIG. 2 illustrates a system embodiment according to the teachings of the present invention. In FIG. 2, the system 200 includes server 201. In particular server 201 is described illustratively here as a representation of any one of the number of servers which can be present in a server cluster. The server 201 includes a processor 202 coupled to a memory device 204. The system further includes software means 203 operative on the server 201. The software means 203 includes a novel software program 203 according to the teachings of the present invention. The software program 203 is operable over a network, e.g. system 200, including a remote client 212, such as an Internet user's computer, and additional servers and systems 206-1, 206-2, etc, to perform methods according to the teachings of the present invention. The software means 203 includes a number of novel software programs, including interface protocols, for carrying out the methods of the present invention.

The novel software programs according to the teachings of the present invention will be executing on system 200. The software means 203 can be resident on the server as shown in FIG. 2, or alternatively, the software means can be resident on any number of the storage devices, e.g. computer readable medium, coupled in system 200. One of ordinary skill in the art will understand the manner in which a software program can be launched from a computer readable medium in a computer based system to execute the functions defined in the software program. One of ordinary skill in the art will further understand the various programming languages which may be employed to create a software program designed to implement and perform the methods of the present invention. In one embodiment, much of the application software is implemented using object oriented programming, hyper-text markup language (HTML) and the like. However, the teachings of the present invention are not limited to a system using object oriented programming and no embodiment of the invention is limited to a particular programming language or environment.

The system shown in FIG. 2 is suitable for exposing Internet users to advertisements together with the distribution of media content in a manner which is germane to conventional syndicated broadcast agreements. That is, according to one embodiment of the present invention, the software means 203 is operable on operable on the processor 202 and memory device 204 for performing the following functions. According to the teachings of the present invention, the software means is operable for obtaining a user specific set of data prior to distributing a media package to an Internet user. The software means is operable for selecting a number of advertisements from a data bank containing a plurality of advertisements based on the user specific set of data. As mentioned above, the data bank can include memory device 204 on server 201, or alternatively can include a data bank resident elsewhere in system 200, e.g. remote servers 206-1 and 206-2. The software means is operable for combining the selected number of advertisements with a requested set of media content to form the media package. According to the teachings of the present invention, the software means 203 is further operable for distributing the media package to the Internet user, e.g. at remote client 212.

In one embodiment of the present invention, obtaining the user specific set of data includes obtaining localizing data. In this embodiment, selecting a number of advertisements includes selecting at least one geographically appropriate advertisement based on the obtained localizing data. In one embodiment of the present invention, combining the selected number of advertisements with a requested set of media content includes combining the selected number of advertisements with a set of syndicated media content. According to the teachings of the present invention, the set of syndicated media content includes media content selected from the group consisting of syndicated radio content, syndicated print content, and syndicated television content. As used in this invention syndicated content is intended to include any media content having a restricted distribution.

In one embodiment of the present invention, combining the selected number of advertisements with a requested set of media content includes combining the selected number of advertisements in a manner such that the selected number of advertisements are displayable as a number of frames on an Internet site. In another embodiment of the present invention, combining the selected number of advertisements with a requested set of media content includes combining the selected number of advertisements in a manner such that the selected number of advertisements are displayable during a number of breaks in the requested media content. In another embodiment, combining the selected number of advertisements with a requested set of media content includes combining the selected number of advertisements as a number of windows on an Internet site. The aforementioned examples are illustrative and not intended to be limiting on the scope combining the selected number of advertisements with a requested set of media content in the present invention.

As one of ordinary skill in the art will understand upon reading this disclosure, such an Internet site is displayable on monitor 47 of the remote client 212. Likewise, one of ordinary skill in the art will understand that such an Internet site is presentable to a user through a speaker or other computer connected output device.

In one embodiment of the present invention, combining the selected number of advertisements with a requested set of media content includes combining the selected number of advertisements with a set of syndicated media content. According to the teachings of the present invention, the set of syndicated media content can be selected from the group consisting of syndicated radio content, syndicated print content, and syndicated television content.

In one embodiment of the present invention, selecting the number of advertisements includes selecting at least one advertisement having a link to a website sponsoring the at least one advertisement.

In one embodiment of the present invention, obtaining a user specific set of data, including localizing data, includes obtaining the localizing data from a positioning system having location information on a mobile Internet user, e.g. a mobile remote client 212. According to the teachings of the present invention, a positioning system includes positioning systems such as a global positioning system (GSP), an ILS positioning system, a LORAN positioning system. In another embodiment of the present invention, obtaining a user specific set of data, including localizing data, includes obtaining the user specific set of data from an Internet Service Provider (ISP) or the like. In another embodiment of the present invention, obtaining the user specific set of data includes accessing a computer being used by the Internet user to receive Internet content and retrieving the user specific set of data therefrom. In another embodiment, obtaining a user specific set of data, including localizing data, includes obtaining the user specific data set of data from a data bank containing a plurality of driver's license information. In still another embodiment, obtaining a user specific set of data, including localizing data, includes obtaining the user specific set of data from a data bank containing a plurality of credit card holder information. As mentioned above, such data banks can include memory device 204 on server 201, or alternatively can include data banks resident elsewhere in system 200, e.g. remote servers 206-1 and 206-2. The aforementioned examples are illustrative and not intended to be limiting on the scope of obtaining user specific data in the present invention.

In one embodiment of the present invention, obtaining a user specific set of data includes a user specific set of data consisting of user demographic data, user physical data, and user psychographic data. According to the teachings of the present invention, the software means 203, operable for selecting the number of advertisements, is operable as a collaborative filter for relationally selecting the number of advertisements based on the user specific set of data. Also, according to the teachings of the present invention, the software means 203, operable for selecting the number of advertisements, is operable for selecting a number of advertisements appropriate for a given time frame. In this embodiment, selecting a number of advertisements appropriate for a given time frame includes allowing subsequent advertisements from a common originator to supersede prior advertisements.

In one embodiment of the present invention, distributing the media package to the Internet user includes distributing a requested set of media content which has been previously distributed, or is being concurrently distributed via convention broadcast mediums.

In one embodiment of the present invention, selecting a number of advertisements from a data bank includes selecting a number of advertisements from a group consisting of regional advertisements and national advertisements. As mentioned above, the data bank can include memory device 204 on server 201, or alternatively can include a data bank resident elsewhere in system 200, e.g. remote servers 206-1 and 206-2. Thus, in one embodiment of the present invention, selecting a number of advertisements from a data bank includes selecting the advertisements from a data bank maintained by a group consisting of a national syndicated show producer, a regional broadcasting station, and a regional advertisement producer. Also, according to the teachings of the present invention, selecting a number of advertisements from a data bank includes selecting a number of advertisements created from a number of sources. As one of ordinary skill in the art will understand upon reading this disclosure, the number of sources includes a group of sources consisting of an audio/video advertisement producer, a print media advertisement producer, and an Internet advertisement producer. As used in this specification the term producer includes brokers and distributors as one of ordinary skill in the art will understand upon reading this disclosure.

Figure 3:
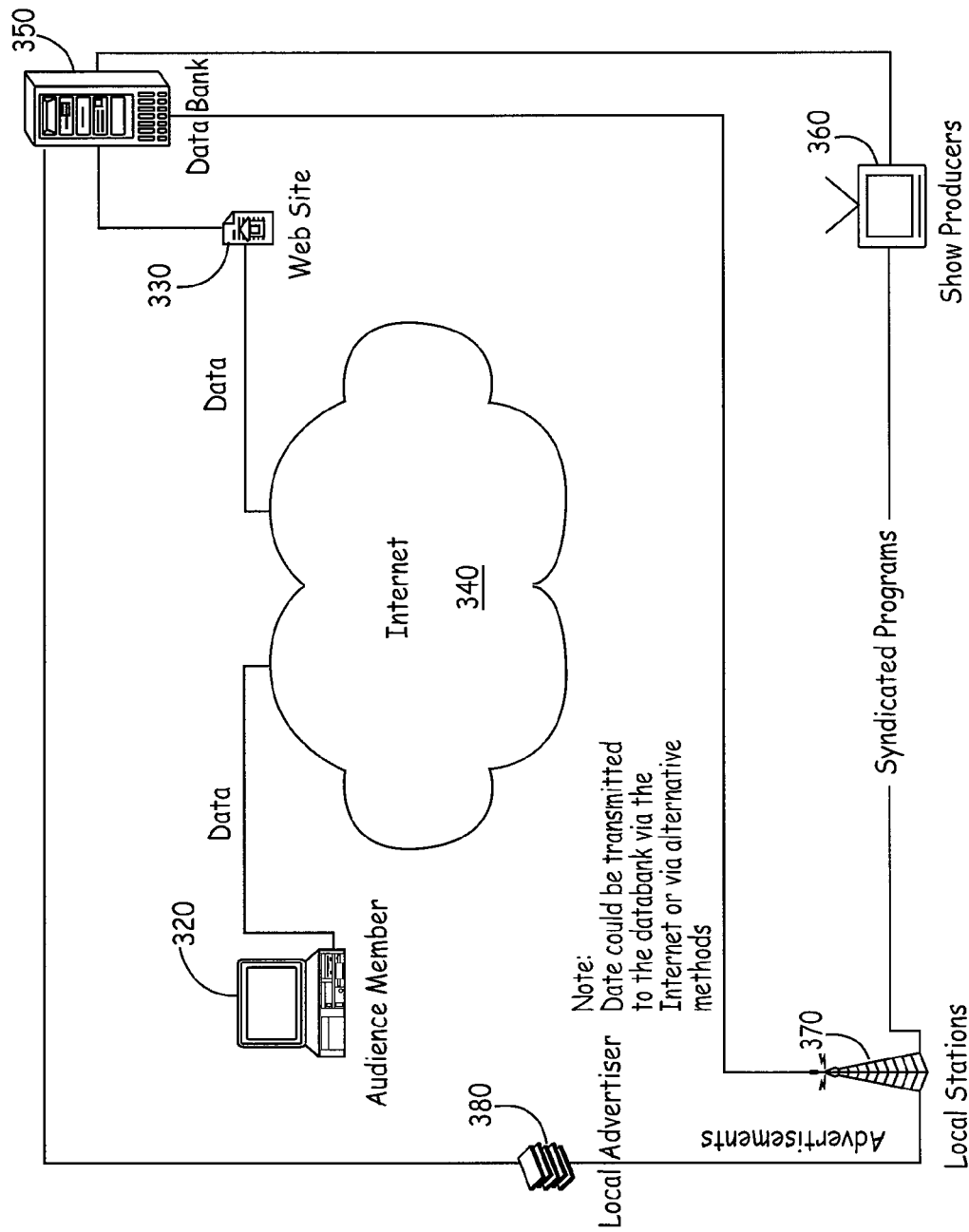
FIG. 3 is a diagram illustrating a broader network embodiment, including the server based system shown in FIG. 2, according to the teachings of the present invention.

FIG. 3 is a diagram illustrating a broader network embodiment, including the server based system shown in FIG. 2, according to the teachings of the present invention. FIG. 3 again illustrates a system for exposing Internet users to advertisements together with the distribution of syndicated media content in a manner which is germane to conventional syndicated broadcast agreements. As shown in FIG. 3, the broader network embodiment of the present invention includes a regional broadcast station 370, an advertisement producer 380, a national producer of syndicated media content 360, and an Internet site adapted to distributing syndicated media content 330. In the embodiment shown in FIG. 3, the server of FIG. 2 is shown as 350 and the remote client of FIG. 2 is shown as 320. Again, server 350 includes processor and memory capabilities and is operatively coupled to the network. As in FIG. 2, software means is operable on the server and network for obtaining localizing data on an Internet user, prior to distributing syndicated media content to the Internet user. The software means is operable for selecting a number of advertisements from a data bank containing a plurality of advertisements based on the obtained localizing data. The software means is operable for combining the selected number of advertisements with a set of syndicated media content to form a media package. And the software means is operable for distributing the media package to the Internet user.

FIG. 3 shows a computer 320 which can be used by an Internet user audience to view a website 330. According to the teachings of the present invention, the website, or Internet site 330, includes a website 330 capable of distributing a media package, including advertising and media content. In one embodiment, the media content includes syndicated media content such as a syndicated television or radio show. The media package can be distributed from the Internet site 330, via the Internet 340, to an Internet user, as the same will be understood by one of ordinary skill in the art upon reading this disclosure. Thus, the Internet user can view or listen to a syndicated television or radio show on an Internet site distributing such a media package according to the teachings of the present invention, by using computer 320 with access through the Internet 340.

FIG. 3 further shows a server 350 as described in more detail in connection with FIG. 2. As mentioned above, the server 350 can include a data bank for storing a plurality of advertisements, or alternatively, a data bank storing a plurality of advertisements according to the teachings of the present invention can be resident elsewhere in the network embodiment shown in FIG. 3. A novel software program according to the teachings of the present invention is operable on server 350 and the network embodiment for performing the methods of the present invention. The same has been explained in more detail above. As stated above, the novel software program is operable for selecting a number of advertisements based on an obtained user specific set of data, and combining the selected advertisement with media content to form a media package. The novel software program of the present invention is further operable for distributing the media package in audio and/or visual format on the Internet site 330. According to the teachings of the present invention, the selected set of advertisements can be distributed as part of the media package to an Internet user at computer 320 in a number of configurable formats as described in more detail below. One of ordinary skill in the art will further understand from reading this disclosure, the various languages in which such a novel software program can be created to accomplish the methods of the present invention. The invention is not so limited.

The present invention ensures that the Internet-accessible show will not adversely affect regional broadcasters serving regional advertising businesses. To do so, the computer program of the present invention, includes acquiring viewer-specific localizing data/information for an Internet user prior to distributing the media package. In one embodiment, if an Internet user, e.g. viewer/listener, has a locality in which the content of the media package is conventionally broadcast, then advertisements/commercials from local advertisers buying time during the conventional broadcast will be included in the media package. In one embodiment, as explained above, these advertisements can be inserted into a number of breaks in the media content, using the novel computer program of the present invention.

Alternatively in another embodiment, the computer program can operate on the Internet site 330 such that the selected advertisements are broadcast on a web page of the Internet site 330 in a format other than traditional commercial breaks. This embodiment will allow the entire media package to be distributed without interruption and allow appropriate advertisements to remain visible in web page format on the Internet site 330 throughout the distribution. According to the teachings of the present invention, the novel computer program is operable for creating or embedding a number of HTML, java scripts, vbscripts, or the like, computer links to other Internet sites, for allowing the Internet user to visit the other sites to learn more information relating to the number of selected advertisements.

Another advantage of the present invention is that if an Internet user, e.g. viewer/listener, has a locality which the conventional, regional broadcasting station cannot reach, e.g. the conventionally broadcast transmission was unavailable, then relevant national and regional advertisement opportunities can still be garnered. Thus, the present invention affords advertisers an opportunity to buy advertising space in a venue that was not previously available.

In one embodiment, shown in FIG. 3, a national show producer, or broadcaster, 360 provides the media content via a direct feed through server 350 having the novel software program of the present invention. In another embodiment, shown in FIG. 2, the national show producer 360 provides the media content via a direct feed to a regional broadcasting station 370 which then provides the media through the server 350 having access to the novel software program. As shown in the embodiment of FIG. 3, a plurality of advertisements from local, or regional advertisers, 380 can be compiled through the regional broadcasting station 370 and then selected and combined with media content through server 350. Alternatively, the local or regional advertiser 380 can provide the plurality of advertisements directly to the server 350. According to the teachings of the present invention, the novel software program is operable for receiving and retrieving the plurality of advertisements, e.g. is operable in either a push or pull architecture. According to the teachings of the present invention, the novel software program operating on server 350 will combine appropriate advertisements with a media content to form a media package designed for a particular Internet user based on the obtained user specific data, including localizing data for computer 320. Hence, an assembled media package, including appropriate national and regional advertisements, can be distributed to the Internet site from a regional or national television/radio broadcast station through server 350 having access to the novel software program.

Figure 4:
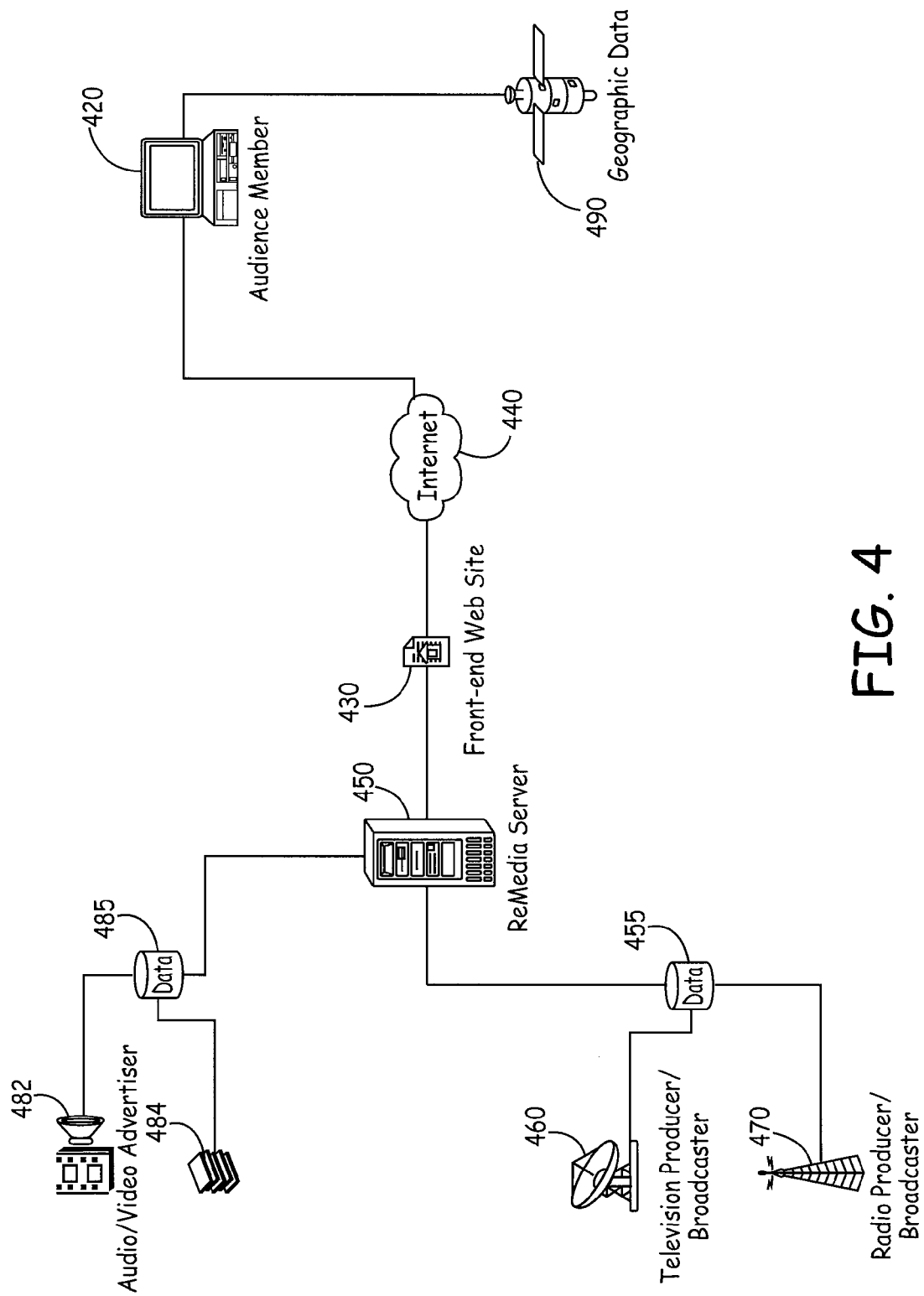
FIG. 4 is a diagram illustrating another broader network embodiment, including the server based system shown in FIG. 2, according to the teachings of the present invention.

FIG. 4 is a diagram illustrating another broader network embodiment, including the server based system shown in FIG. 2, according to the teachings of the present invention. FIG. 4 again illustrates a system for exposing Internet users to advertisements together with the distribution of syndicated media content in a manner which is germane to conventional syndicated broadcast agreements. As shown in FIG. 4, the broader network embodiment of the present invention includes a television broadcast station 460, a number of advertisement producers 482 and 485, a radio broadcast station 470, and an Internet site adapted to distributing syndicated media content 430. In the embodiment shown in FIG. 4, the server of FIG. 2 is shown as 450 and the remote client of FIG. 2 is shown as 420. Again, server 450 includes processor and memory capabilities and is operatively coupled to the network. As in FIG. 2, software means is operable on the server and network for obtaining localizing data on an Internet user, prior to distributing syndicated media content to the Internet user. The software means is operable for selecting a number of advertisements from a data bank containing a plurality of advertisements based on the obtained localizing data. The software means is operable for combining the selected number of advertisements with a set of syndicated media content to form a media package. And the software means is operable for distributing the media package to the Internet user.

In the embodiment shown in FIG. 4, the Internet site receives the broadcast transmission through server 450 from a broadcast data bank 455. In the embodiment shown in FIG. 4, the same routing applies, however, the media content is illustrated as being received from either a regional/national television producer 460 and/or a regional/national radio broadcaster 470 and stored in broadcast data bank 455. As mentioned above, the server 450 can include a broadcast data bank for storing the media content, or alternatively, as shown in FIG. 4 the broadcast data bank can be resident elsewhere in the network. Using the novel software program of the present invention, the server 450 can retrieve and re-distribute media content which "aired" at an earlier time. According to the teachings of the present invention, the novel software program is operable for receiving and retrieving the plurality of advertisements, e.g. is operable in either a push or pull architecture. In this manner, the Internet site 430 can provide a re-distributed version of syndicated media content. The embodiment discussed in connection in FIG. 2, presented the selection and combination of a number of advertisements with media content into a media package at a number of breaks, or as a number of frames in the media package. However, as mentioned earlier, the invention is not so limited. In an alternate embodiment of the present invention, the novel software program operating on server 450 will combine appropriate, e.g. tagged, advertisements with media content to create the media package in any desired format. Examples of the same include, but are not limited to dovetailing, frames, pop-up windows, or the like.

FIG. 4 further shows a server 450 as described in more detail in connection with FIG. 2. As mentioned above, the server 450 can include a data bank for storing a plurality of advertisements, or alternatively, a data bank storing a plurality of advertisements according to the teachings of the present invention can be resident elsewhere in the network embodiment shown in FIG. 4. A novel software program, according to the teachings of the present, invention is operable on server 450 and the network embodiment for performing the methods of the present invention. The same has been explained in more detail above. As stated above, the novel software program is operable for selecting a number of advertisements based on an obtained user specific set of data, and combining the selected advertisement with media content to form a media package. The novel software program of the present invention is further operable for distributing the media package in audio and/or visual format on the Internet site 430. Thus, in one embodiment of the present invention, selecting a number of advertisements from a data bank includes selecting the advertisements from a data bank maintained by a group consisting of a national syndicated show producer, a regional broadcasting station, and a regional advertisement producer. Also, according to the teachings of the present invention, selecting a number of advertisements from a data bank includes selecting a number of advertisements created from a number of sources. As one of ordinary skill in the art will understand upon reading this disclosure, the number of sources includes a group of sources consisting of an audio/video advertisement producer, a print media advertisement producer, and an Internet advertisement producer.

As mentioned above, the a plurality of advertisements are stored in a data bank/database. The stored plurality of advertisements can exist on the memory of server 450 or elsewhere in the network, e.g. in a data bank maintained by a group consisting of a national syndicated show producer, a regional broadcasting station, and a regional advertisement producer. The embodiment shown in FIG. 4 illustrates the plurality of advertisements stored in an advertisement data bank 485 residing on the network and containing advertisements received from regional/national advertisement producers. This advertisement data bank 485 can include advertisements created from a number of sources. According to the teachings of the present invention, the number of sources includes sources selected from the group consisting of an audio/video advertisement producer 482, a print media advertisement producer, and/or an Internet advertisement producer (the later shown collectively as 484). According to the teachings of the present invention, the novel software program is operable for receiving and retrieving the plurality of advertisements, e.g. is operable in either a push or pull architecture. According to the teachings of the present invention, the novel software program operating on server 450 will combine appropriate advertisements with a media content to form a media package designed for a particular Internet user based on the obtained user specific data, including localizing data for computer 420. As one of ordinary skill in the art will understand upon reading this disclosure, the present invention provides significant flexibility in allowing advertisers to choose a format, and/or allowing the viewer to choose a preferred format. It also provides the advertisers with the option of developing interactive advertisements complete with links to other websites where more information about a product may be obtained.

As mentioned above, the present invention protects the interests of regional broadcasters serving local advertisers in that the novel software program must acquire general geographic or localizing data/information pertaining to the viewer or listener. According to the teachings of the present invention, there are a number of ways, or different embodiments, through which the novel software program can acquire this general localizing data. In one embodiment, the novel software program operable for obtaining a user specific set of data includes requiring an Internet user to input the data. In one embodiment, the Internet user can enter a residential zip code to provide the software program with localizing data. In this embodiment, the novel software program can prompt the Internet user to enter this information when accessing Internet site 430, prior to distributing a media package. For instance, the user could be asked to enter his or her zip code, nearest major city, or select from a pull down menu of geographic regions, etc. Alternatively, the Internet user's computer 420 can provide a cookie having the required information, or a code pertaining to stored localizing data. In this instance, obtaining the localizing data will be transparent to the Internet user located at computer 420. In still another embodiment, the obtaining the user specific set of data can include obtaining the user specific set of data from another computer/remote client. Again, according to the teachings of the present invention, the novel software program is operable for receiving and retrieving the user specific data, e.g. is operable in either a push or pull architecture. That is, the user specific data can be conveyed to the novel software program by another Internet site from which the user was referred. As understood by one of ordinary skill in the art, a cookie can be stored on an Internet user's computer 420 as a result of a visit to the Internet site/website 430, or may be placed there by another website having an affiliation with Internet site 430.

For example, if the user went to latenightshow.com from a link thereto found on another site such as televisionguide.com, and if the user had logged into the televisionguide.com site in order to be able to choose various media content from a list, then the televisionguide.com site would be able to pass user data on to other Internet sites such as latenightshow.com. Similarly, according to the teachings of the present invention, an Internet user can visit a variety of media content sites 430 without having to repeatedly provide the necessary user specific data to the novel software program when accessing each Internet site.

Likewise, one of ordinary skill in the art will understand upon reading this disclosure that advertisers, having their own websites, can provide advertisements to the Internet site 430 by providing links, where deemed appropriate by the software program, to the Internet show sites 430. If the commercial advertiser sites have user specific data, including localizing information, then the invention will facilitate the transmission of this information to the novel software program operating on server 450 for appropriate combination of the advertisements with the media content of an Internet show site 430. Hence, according to the teachings of the present invention, a user directed to the syndicated Internet show site 430 from the Internet advertiser's site, would not have to enter the localizing information.

As another example, if an Internet user was visiting a site such as localairline.com to check his or her frequent flyer miles, the user at computer 420 would necessarily have to enter some sort of identifying personal information such as a frequent flyer number. As understood by one of ordinary skill in the art, localairline.com could use this number to access localizing information pertaining to the user at computer 420. If the member of the Internet audience uses a link on the localairline.com site to access the latenightshow.com site, e.g. Internet media content site 430, that localizing information will, according to one embodiment of the present invention, be provided to the novel software program of the present invention. In this manner, the novel software program of the present invention can further integrate appropriate advertisements into the media content from Internet site 430 to form a complete media package without the need for the Internet user to resubmit this information.

In another embodiment of the present invention, it is recognized that some Internet users will be accessing the Internet show site 430 using a mobile computer 420, such as a cellular Internet connection or other wireless technologies using wireless application protocols (WAP). These Internet users will be seeking to receive, audio and/or video, media content while riding in a vehicle and, therefore, may be changing geographic areas. According to the teachings of the present invention, the novel software program will continue to select and combine a number of advertisements with the media content, but will be obtaining the user specific set of data, including localizing data, via other means. This aspect is captured in the broader network embodiment shown in FIG. 4. In one embodiment of FIG. 4, localizing data for a computer 420 being used by the Internet user is obtained from an Internet Service Provider (ISP). In another embodiment of FIG. 4, the localizing data is obtained by use of a positioning system, shown at 490, as the same is know and understood by one of ordinary skill in the art. In this embodiment, the information received by various positioning systems is provided to the novel software program operating via the Internet 440 in order to provide the localizing data/information.

As mentioned above in connection with FIG. 1, it is noted that "computer", as used in connection with this invention, includes any device allowing a person to use the Internet to view, hear or otherwise obtain Internet media content. These devices include, but are by no means limited to: personal computers, hand-held computing devices, hand-held organizers, cellular telephones, televisions, set-top-boxes, etc.

Figure 5:
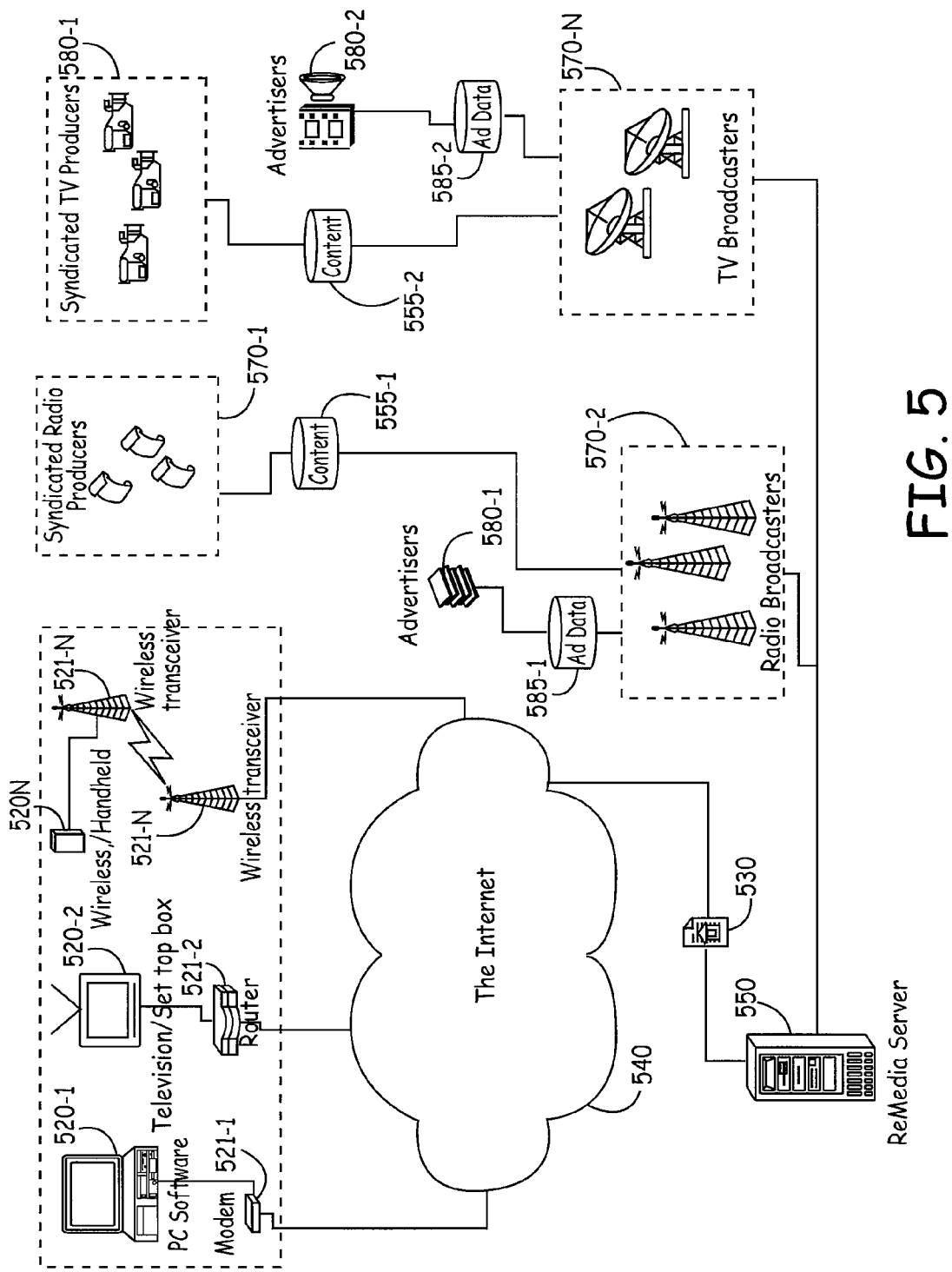
FIG. 5 is a diagram illustrating another broader network embodiment, including the server based system shown in FIG. 2, according to the teachings of the present invention.

FIG. 5 is a diagram illustrating another broader network embodiment, including the server based system shown in FIG. 2, according to the teachings of the present invention. FIG. 5 again illustrates a system for exposing Internet users to advertisements together with the distribution of media content in a manner which is germane to conventional syndicated broadcast agreements. FIG. 5 is provided as an illustration of the coordination of the present invention with the various "computer" devices listed above. That is, FIG. 5 includes components illustrated and discussed in connection with FIGS. 2-4, but further illustrates the Internet distribution as received by any number of Internet access capable devices such as the personal computer, television/set-top-box, and wireless/hand-held devices 520-1, 520-2, . . . , 520-N. The embodiment of FIG. 5 further illustrates that the Internet distribution will be integrated into such devices, 520-1, 520-2, . . . , 520-N through appropriate channels such as a modem, router, and/or wireless transceiver, shown as 521-1, 521-2, . . . , 521-N respectively. One of ordinary skill in the art will understand the integration of such respective channels in combination with reading this disclosure.

Another aspect of the invention pertains to selecting which from among the plurality of advertisements to integrate into any given media content to form the media package. As explained in detail above, geography (in the form of localizing data) is one entering argument, but another is time. In the event the Internet distribution is a re-broadcast, it is preferable to integrate the most current advertising with the media content to create the media package. Even more, the novel software program of the present invention facilitates a mechanism by which advertisers themselves can select which advertisements to include at specific times. That is, in one embodiment of the present invention the novel software program is operable for interpreting an expiration time or date connected to any given advertisement indicating when the advertisement should no longer be shown. In an embodiment of the present invention, the novel software program is operable for interpreting an origination time connected to any given advertisement indicating a first date and/or time the advertisement was shown. And, the novel software program of the present invention is further operable for allowing subsequent advertisements from a common originator to supersede prior advertisements. In other words, the novel software of the present invention facilitates setting specific time frames for when a commercial/advertisement is included and when it should expire.

Figure 6:
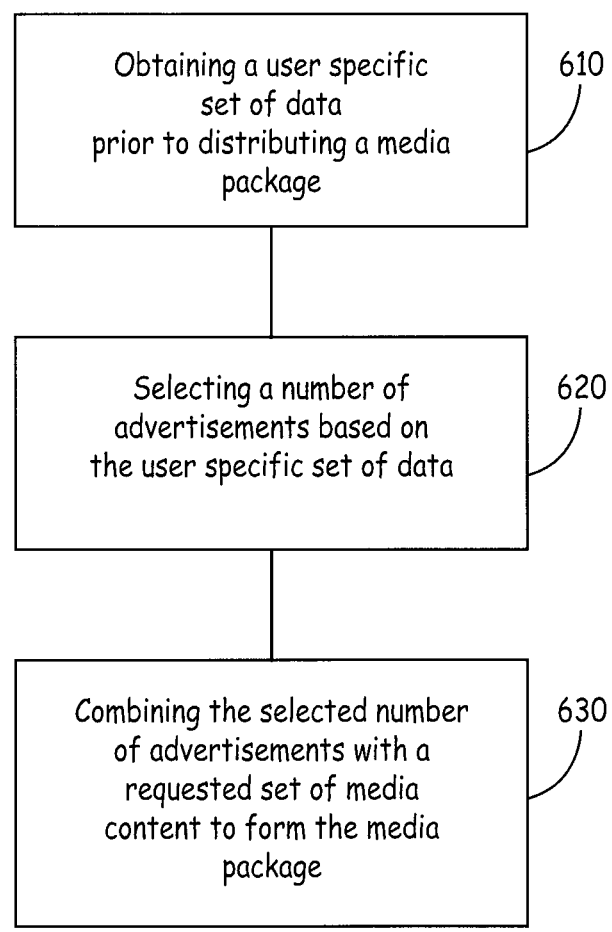
FIG. 6 is a flowchart diagramming a method embodiment for present invention operable in connection with the component embodiments illustrated in FIGS. 1-5.

FIG. 6 is a flowchart diagramming a method embodiment for present invention operable in connection with the component embodiments illustrated in FIGS. 1-5. As shown in FIG. 6, a method of exposing Internet users to specific advertisements is provided. The method includes obtaining a user specific set of data prior to distributing a media package 610. The method includes selecting a number of advertisements from a data bank containing a plurality of advertisements based on the user specific set of data 620. The method includes combining the selected number of advertisements with a requested set of media content to form the media package 630. In one embodiment, the method further includes distributing the media package to the Internet user.

In one embodiment of the present invention, obtaining the user specific set of data includes obtaining a set of localizing data for the Internet user. In one embodiment, obtaining the user specific set of data includes obtaining user specific data selected from the group consisting of user demographic data, user physical data, and user psychographic data. In one embodiment, selecting the number of advertisements includes selecting a number of geographically tagged advertisements. In one embodiment, combining the selected number of advertisements with a requested set of media content to form the media package includes integrating the number of advertisements with the requested set of media content. In one embodiment, combining the selected number of advertisements with a requested set of media content to form the media package includes providing links to other Internet sites, embedded in the number of selected advertisements, for allowing the Internet user to visit the other sites to learn more information relating to the number of selected advertisements.

In one embodiment, obtaining a user specific set of data includes requiring an Internet user to input said data. In one embodiment, obtaining the user specific set of data includes accessing a computer being used by the Internet user to receive Internet content and retrieving the user specific set of data therefrom. In another embodiment, obtaining the user specific set of data includes receiving the user specific set of data from an Internet Service Provider (ISP).

Figure 7:
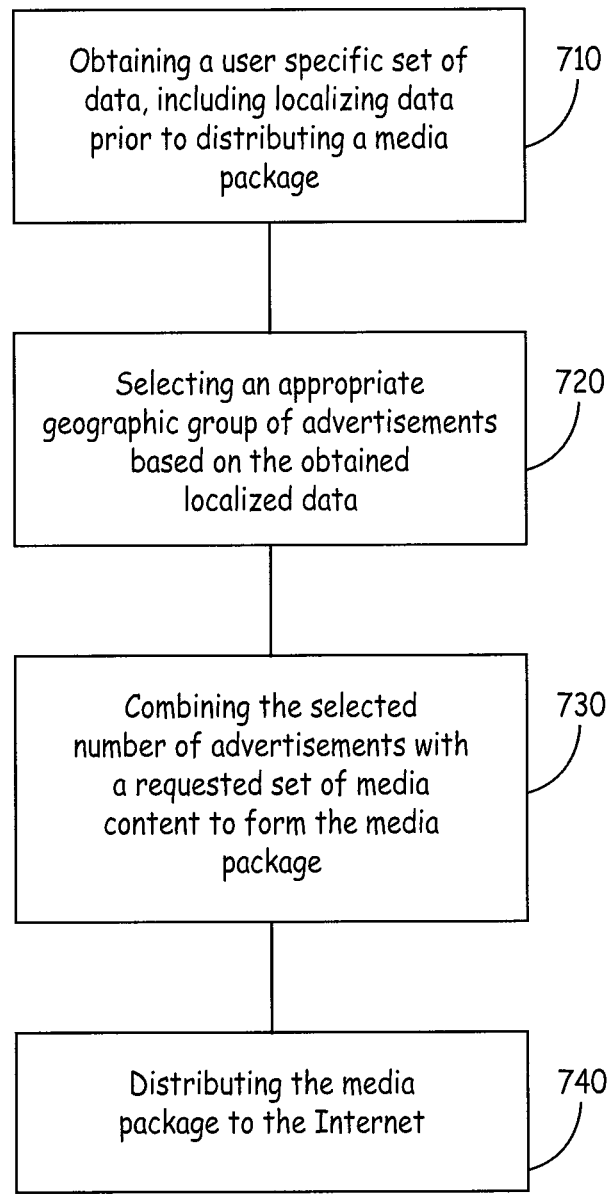
FIG. 7 is a flowchart diagramming another method embodiment for present invention operable in connection with the component embodiments illustrated in FIGS. 1-5.

FIG. 7 is a flowchart diagramming another method embodiment for present invention operable in connection with the component embodiments illustrated in FIGS. 1-5. As shown in FIG. 7, a method of exposing an Internet user to advertisements together with the distribution of requested media content is provided. The method includes obtaining a user specific set of data, including localizing data, prior to distributing a media package 710. The method includes selecting a number of advertisements from a data bank containing a plurality of advertisements based on the user specific set of data 720. Here, selecting the number of advertisements includes selecting an appropriate geographic group of advertisements based on the obtained localizing data. The method further includes combining the selected number of advertisements with a requested set of media content to form the media package 730. And, the method further includes distributing the media package to the Internet user 740.

In one embodiment, selecting the number of advertisements includes selecting a number of advertisements appropriate for a given time frame. In one embodiment, selecting a number of advertisements from a data bank includes selecting a number of advertisements from a group consisting of regional advertisements and national advertisements. In one embodiment, selecting a number of advertisements from a data bank includes selecting the advertisements from a data bank maintained by a group consisting of a national syndicated show producer, a regional broadcasting station, and a regional advertisement producer. In one embodiment, selecting a number of advertisements from a data bank includes selecting a number of advertisements created from a number of sources. In this embodiment, the number of sources includes sources selected from the group consisting of an audio/video advertisement producer, a print media advertisement producer, and an Internet advertisement producer. As used in this specification, the term producer is intended to include brokers and distributors. In one embodiment, obtaining a set of user specific data, including localizing data, includes obtaining the localizing data from a positioning system having location information on the Internet user.

In one embodiment, the requested set of media content includes a set of media content that has been previously distributed. In one embodiment of FIG. 7, combining the selected number of advertisements with a requested set of media content includes combining the selected number of advertisements with a set of syndicated media content. As used in connection with this specification, the term syndicated is intended to include media content having a restricted distribution.

Figure 8:
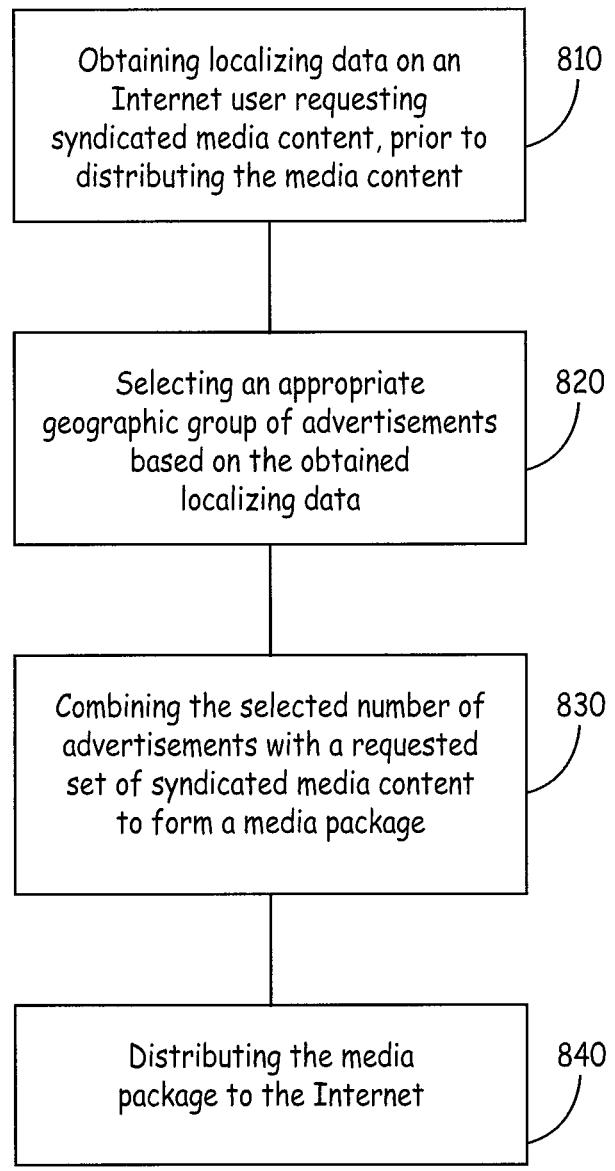
FIG. 8 is a flowchart diagramming another method embodiment for present invention operable in connection with the component embodiments illustrated in FIGS. 1-5.

FIG. 8 is a flowchart diagramming another method embodiment for present invention operable in connection with the component embodiments illustrated in FIGS. 1-5. As shown in FIG. 8, a method for exposing Internet users to advertisements together with the distribution of syndicated media content in a manner that is germane to conventional syndicated broadcast agreements is provided. The method includes obtaining localizing data on an Internet user requesting syndicated media content, prior to distributing the media content 810. The method includes selecting a number of advertisements from a data bank containing a plurality of advertisements based on the obtained localizing data 820. Here, selecting the number of advertisements includes selecting an appropriate geographic group of advertisements based on the obtained localizing data. The method further includes combining the selected number of advertisements with a requested set of syndicated media content to form a media package 830. And, the method includes distributing the media package to the Internet user 840.

Figure 9:
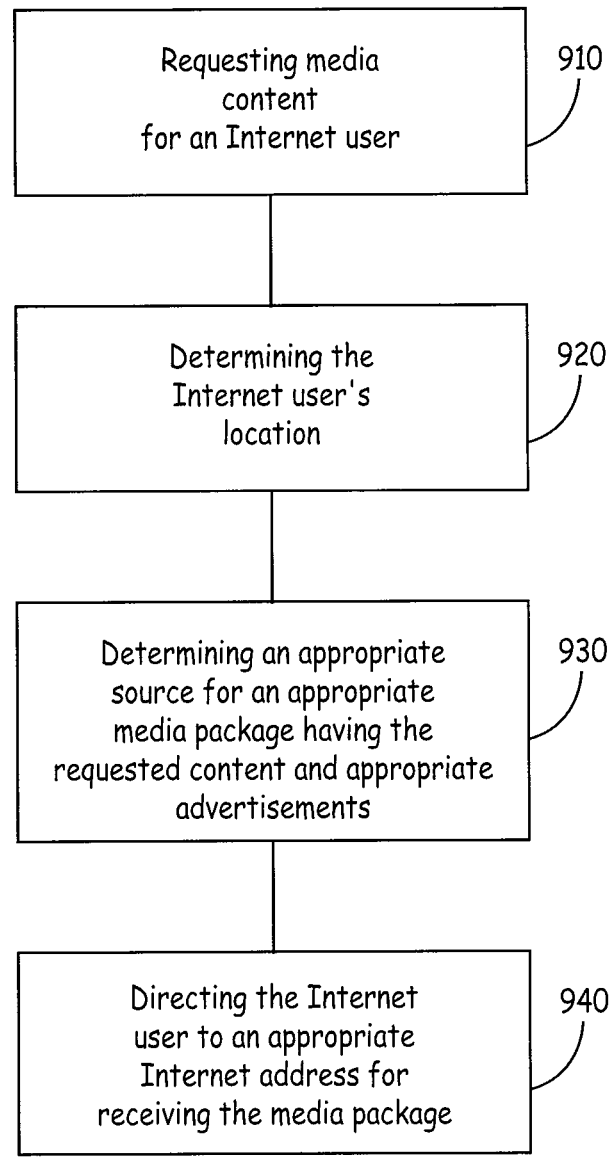
FIG. 9 is a flowchart diagramming another method embodiment for present invention operable in connection with the component embodiments illustrated in FIGS. 1-5.

FIG. 9 is a flowchart diagramming another method embodiment for present invention operable in connection with the component embodiments illustrated in FIGS. 1-5. As shown in FIG. 9, a method for exposing Internet users to advertisements together with the distribution of syndicated media content in a manner that is germane to conventional syndicated broadcast agreements is provided. The method of FIG. 9 is directed to a pre-mixed, live show data flow. The method includes a request for media content 910. For example an Internet user can access a website and request certain media content, as the same has been described in this application. The method includes using the novel software program for determining the Internet user's location 920. Determining the Internet user's location includes obtaining user specific data as the same has been described in detail above. According to the method embodiment shown in FIG. 9, the novel software program is operable for determining an appropriate source for a media package 930. As describe in detail in connection with this application, determining an appropriate source for a media package includes a source for a media package including a number of appropriate geographic advertisements based on the obtained user specific data and the requested media content. According to the teachings of the present invention the requested media content includes syndicated media content, e.g. media content having a restricted distribution. As one of ordinary skill in the art will understand upon reading this disclosure, the appropriate geographic group of advertisements based on the obtained localizing data includes appropriate geographic advertisements selected from the group consisting of regional retail advertisements, national retail advertisements, and regional informational advertisements.

As one of ordinary skill in the art will understand upon reading this disclosure, the media package can include a media package which has been previously distributed, or which is concurrently distributed via conventional broadcast mediums. In one embodiment of FIG. 9, an Internet user is then directed to an appropriate Internet address for receiving the media package 940. One of ordinary skill in the art will understand upon reading this disclosure the manner in which the novel software program is operable for directing an Internet user to an Internet address.

Figure 10:
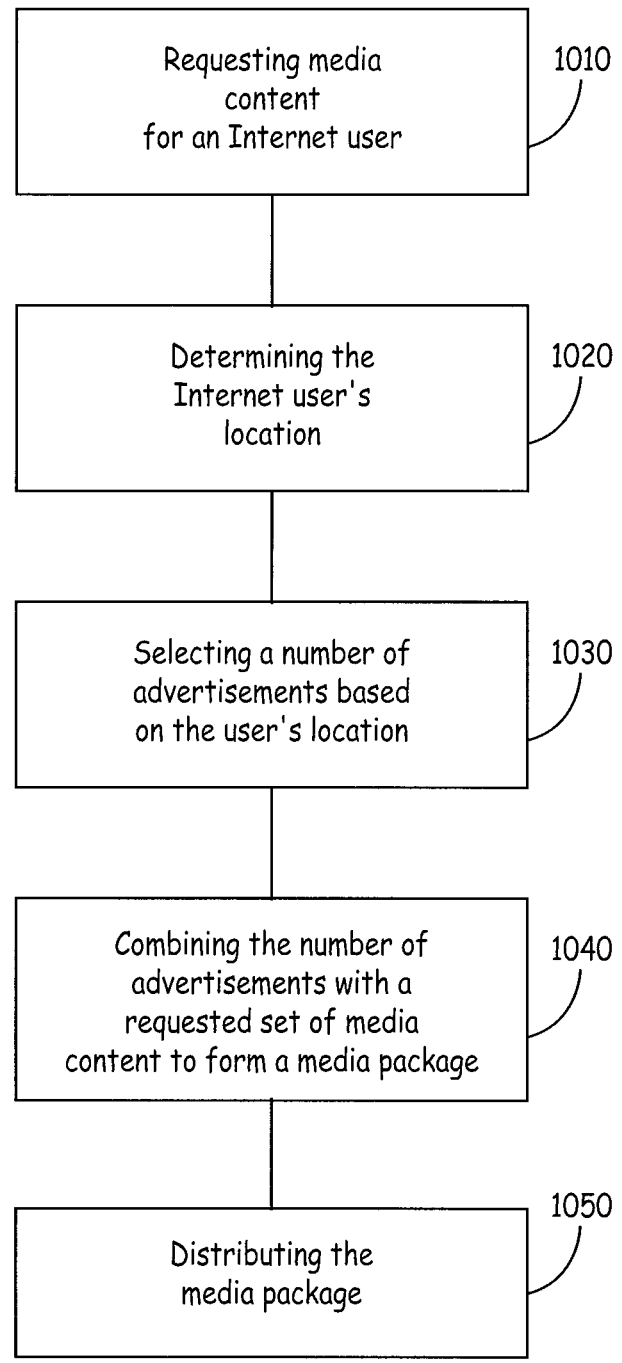
FIG. 10 is a flowchart diagramming another method embodiment for present invention operable in connection with the component embodiments illustrated in FIGS. 1-5.

FIG. 10 is a flowchart diagramming another method embodiment for present invention operable in connection with the component embodiments illustrated in FIGS. 1-5. As shown in FIG. 10, a method for exposing Internet users to advertisements together with the distribution of syndicated media content in a manner that is germane to conventional syndicated broadcast agreements is provided. The method of FIG. 10 is directed to a compile on demand data flow. The method includes a request for media content 1010. For example an Internet user can access a website and request certain media content, as the same has been described in this application. The method includes using the novel software program of the present invention for determining the Internet user's location 1020. Determining the Internet user's location includes obtaining user specific data as the same has been described in detail above. According to the method embodiment shown in FIG. 10, the novel software program is operable for selecting a number of advertisements based on the user specific data 1030. The user specific data includes the user specific data as the same has been described and explained in detail in this specification. The method embodiment of FIG. 10 includes combining the selected number of advertisements with a requested set of media content to form a media package 1040. As describe in detail in connection with this application, the media package includes a number of appropriate geographic advertisements and syndicated media content, e.g. media content having a restricted distribution. As one of ordinary skill in the art will understand upon reading this disclosure, the media package can include a media package which has been previously distributed, or which is concurrently distributed via conventional broadcast mediums. In one embodiment of FIG. 10, the method further includes distributing the media package 1050. For example, by way of illustration and not by way of limitation, distributing the media package according to the present invention can include distributing the media package to an Internet user requesting the media content.

CONCLUSION

Thus, a system and method for exposing Internet users to advertisements together with the distribution of media content in a manner which is germane to conventional syndicated broadcast agreements has been provided. The system includes a processor coupled to a memory device. The system further includes software means operable on the processor and memory device. The software means is operable on the processor for obtaining a user specific set of data prior to distributing a media package to an Internet user. The software means is operable for selecting a number of advertisements from a data bank containing a plurality of advertisements based on the user specific set of data. The software means is operable for combining the selected number of advertisements with a requested set of media content to form the media package. The software means is further operable for distributing the media package to the Internet user. In this manner a regional broadcasting station can preserve its investment in purchasing national syndicate broadcast rights by ensuring regional advertisers a penetration of their advertisements across a regional Internet audience. Other advantages as mentioned above are similarly provided.

The foregoing is considered as illustrative only of the principles of the invention. Furthermore, since numerous modifications and changes will readily occur to those skilled in the art, it is not desired to limit the invention to the exact organization and operation shown and described. While the preferred embodiment has been described, the details may be changed without departing from the invention, which is defined by the claims.

What is claimed is:

1. A system for exposing Internet users to advertisements together with the distribution of media content in a manner which is germane to conventional broadcast agreements, comprising:
 a processor;
 a memory device coupled to the processor; and
 software operable on the processor and memory device for:
  automatically obtaining a user specific set of data prior to distributing a media package to an Internet user, wherein the process of automatically obtaining the user specific set of data is performed invisibly to the Internet user;
  selecting an advertisement from a data bank containing a plurality of advertisements based on the user specific set of data; and
  combining the selected advertisement with a requested set of media content to form the media package.

2. The system of claim 1 wherein the software is further operable for distributing the media package to the Internet user.

3. The system of claim 2 wherein the user specific set of data comprises localizing data, and wherein selecting an advertisement includes selecting at least one geographically appropriate advertisement based on the obtained localizing data.

4. The system of claim 1 wherein combining the selected advertisement with a requested set of media content includes combining the selected advertisement with a set of syndicated media content.

5. The system of claim 1 wherein the set of media content is selected from the group consisting of radio content, print content, and video content.

6. The system of claim 1 wherein combining the selected advertisement with a requested set of media content includes combining the selected advertisement in a manner such that the selected advertisement is displayable as one or more frames on an Internet site.

7. The system of claim 1 wherein selecting the advertisement includes selecting at least one advertisement having a link to a website sponsoring the at least one advertisement.

8. The system of claim 1 wherein combining the selected advertisement with a requested set of media content includes combining the selected advertisement in a manner such that the selected advertisement is displayable during a break in the requested media content.

9. The system of claim 1, wherein automatically obtaining a user specific set of data includes automatically obtaining the data from an Internet site.

10. A system for exposing Internet users to advertisements together with the distribution of media content in a manner which is germane to conventional broadcast agreements, comprising:
 a processor;
 a memory device coupled to the processor; and
 software operable on the processor and memory device for:
  obtaining a user specific set of data, including automatically obtaining localizing data, prior to distributing a media package to an Internet user, wherein the process of automatically obtaining localizing data is performed invisibly to the Internet user;
  selecting an advertisement from a data bank containing a plurality of advertisements based on the user specific set of data, wherein selecting the advertisement includes selecting an appropriate geographic advertisement based on the obtained localizing data;
  combining the selected advertisement with a requested set of media content to form the media package; and
  distributing the media package.

11. The system of claim 10 wherein obtaining a user specific set of data, including automatically obtaining localizing data, includes automatically obtaining the localizing data from a positioning system having location information on a mobile Internet user.

12. The system of claim 10 wherein obtaining a user specific set of data, including automatically obtaining localizing data, includes automatically obtaining the user specific set of data from an Internet Service Provider (ISP).

13. The system of claim 10 wherein obtaining a user specific set of data includes a user specific set of data comprising user demographic data, user physical data, and user psychographic data.

14. The system of claim 13 wherein the software operable for selecting the advertisement is operable as a collaborative filter for relationally selecting the advertisement based on the user specific set of data.

15. The system of claim 10 wherein obtaining a user specific set of data, including automatically obtaining localizing data, includes querying a computer being used by the Internet user to receive Internet content and automatically retrieving the user specific set of data therefrom.

16. The system of claim 10 wherein combining the selected advertisement with a requested set of media content includes combining the selected advertisement with a set of syndicated media content.

17. The system of claim 10 wherein the set of media content is selected from the group consisting of radio content, print content, and video content.

18. The system of claim 10 wherein selecting the advertisement includes selecting an advertisement appropriate for a given time frame.

19. The system of claim 18 wherein selecting an advertisement appropriate for a given time frame includes allowing subsequent advertisements from a common originator to supersede prior advertisements.

20. The system of claim 10 wherein obtaining a user specific set of data, including automatically obtaining localizing data, includes automatically obtaining the user specific data set of data from a data bank containing a plurality of driver's license information.

21. The system of claim 10 wherein obtaining a user specific set of data, including automatically obtaining localizing data, includes automatically obtaining the user specific set of data from a data bank containing a plurality of credit card holder information.

22. The system of claim 10, wherein obtaining a user specific set of data, including automatically obtaining localizing data, includes automatically obtaining the data from an Internet site.

23. A system for exposing Internet users to advertisements, comprising:
a processor;
a memory device coupled to the processor; and
software means operable on the processor and memory device for:
obtaining a user specific set of data, including automatically, and without visibility to an Internet user, obtaining localizing data, prior to distributing a media package to the Internet user;
selecting an advertisement from a data bank containing a plurality of advertisements based on the user specific set of data, wherein selecting the advertisement includes selecting an appropriate geographic advertisement based on the obtained localizing data;
combining the selected advertisement with a requested set of media content to form the media package;
distributing the media package to the Internet user, wherein the requested set of media content includes a set of media content which has been previously distributed.

24. The system of claim 23 wherein selecting an advertisement from a data bank includes selecting an advertisement from a group consisting of regional advertisements and national advertisements.

25. The system of claim 23 wherein selecting an advertisement from a data bank includes selecting the advertisement from a data bank maintained by a group consisting of a national show producer, a regional broadcasting station, and an advertisement producer.

26. The system of claim 23 wherein selecting an advertisement from a data bank includes selecting an advertisement from a number of sources, the number of sources consisting of an audio/video advertisement producer, a print media advertisement producer, and an Internet advertisement producer.

27. A system for exposing Internet users to advertisements together with the distribution of media content in a manner which is germane to conventional broadcast agreements, comprising:
a network including a regional broadcast station, an advertisement producer, a national producer of media content, and an Internet site adapted to distributing media content;
a server, having processor and memory capabilities, operatively coupled to the network; and software operable on the server and network for:
automatically obtaining localizing data on an Internet user, prior to distributing media content to the Internet user, wherein automatically obtaining the localizing data is performed invisibly to the Internet user;
selecting an advertisement from a data bank containing a plurality of advertisements based on the obtained localizing data;
combining the selected advertisement with a set of media content to form a media package;
distributing the media package to the Internet user.

28. The system of claim 27 wherein selecting the advertisement includes selecting an appropriate geographic advertisement based on the localizing data.

29. The system of claim 28 wherein the appropriate geographic advertisement is selected from a group consisting of regional advertisements and national advertisements.

30. The system of claim 27 wherein the set of media content includes a set of media content that has been previously distributed.

31. The system of claim 27 wherein automatically obtaining localizing data on the Internet user includes automatically obtaining the localizing data from a positioning system having location information for a mobile Internet user.

32. A method of exposing Internet users to specific advertisements, comprising:
automatically obtaining a user specific set of data prior to distributing a media package wherein automatically obtaining the user specific set of data is performed invisibly to the Internet users;
selecting an advertisement from a data bank containing a plurality of advertisements based on the user specific set of data;
combining the selected advertisement with a requested set of media content to form the media package; and
distributing the media package.

33. The method of claim 32 wherein automatically obtaining the user specific set of data includes automatically obtaining a set of localizing data for an Internet user.

34. The method of claim 32 wherein automatically obtaining the user specific set of data includes automatically obtaining demographic data for an Internet user.

35. The method of claim 32 wherein selecting the advertisement includes selecting a geographically tagged advertisement.

36. The method of claim 32 wherein combining the selected advertisement with a requested set of media content to form the media package includes integrating the advertisement with the requested set of media content.

37. The method of claim 32 wherein combining the selected advertisement with a requested set of media content to form the media package includes providing one or more links to other Internet sites, embedded in the media package, for allowing an Internet user to visit other Internet sites to learn more information relating to the selected advertisement.

38. The method of claim 32 wherein automatically obtaining the user specific set of data includes accessing a computer being used by an Internet user to receive Internet content and automatically retrieving the user specific set of data therefrom.

39. The method of claim 32 wherein automatically obtaining the user specific set of data includes automatically obtaining the user specific set of data from an Internet Service Provider (ISP).

40. The method of claim 32, wherein automatically obtaining the user specific set of data includes automatically obtaining the data from an Internet site.

41. A method of exposing an Internet user to advertisements together with the distribution of requested media content, comprising:
obtaining a user specific set of data, including automatically obtaining localizing data, prior to distributing a media package to an Internet user, wherein automatically obtaining localizing data is performed invisibly to the Internet user;
selecting an advertisement from a data bank containing a plurality of advertisements based on the user specific set of data, wherein selecting the advertisement includes selecting an appropriate geographic advertisement based on the obtained localizing data;

combining the selected advertisement with a requested set of media content to form the media package;

distributing the media package to the Internet user.

42. The method of claim 41, wherein selecting the advertisement includes selecting an advertisement appropriate for a given time frame.

43. The method of claim 41 wherein selecting an advertisement from a data bank includes selecting an advertisement from a group consisting of regional advertisements and national advertisements.

44. The method of claim 41 wherein selecting an advertisement from a data bank includes selecting the advertisement from a data bank maintained by a group consisting of a national show producer, a regional broadcasting station, and an advertisement producer.

45. The method of claim 41 wherein selecting an advertisement from a data bank includes selecting an advertisement from a number of sources, the number of sources consisting of an audio/video advertisement producer, a print media advertisement producer, and an Internet advertisement producer.

46. The method of claim 41 wherein obtaining a set of user specific data, including automatically obtaining localizing data, includes automatically obtaining the localizing data from a positioning system having location information on the Internet user.

47. A method for exposing Internet users to advertisements, comprising:

obtaining a set of user specific set of data, including automatically, and without visibility to an Internet user, obtaining localizing data, prior to distributing a media package;

selecting an advertisement from a data bank containing a plurality of advertisements based on the user specific set of data, wherein selecting the advertisement includes selecting an appropriate geographic advertisement based on the obtained localizing data;

combining the selected advertisement with a requested set of media content to form the media package; and distributing the media package, wherein the requested set of media content includes a set of media content which has been previously distributed.

48. The method of claim 47 wherein combining the selected advertisement with a requested set of media content includes combining the selected advertisement with a set of syndicated media content.

49. A method for exposing Internet users to advertisements together with the distribution of media content in a manner which is germane to conventional broadcast agreements, comprising:

automatically, and without visibility to an Internet user, obtaining localizing data on an Internet user requesting media content;

selecting an advertisement from a data bank containing a plurality of advertisements based on the obtained localizing data, wherein selecting the advertisement includes selecting an appropriate geographic advertisement based on the obtained localizing data;

combining the selected advertisement with a requested set of media content to form a media package; and distributing the media package to the Internet user.

50. A method for exposing Internet users to advertisements together with the distribution of media content in a manner which is germane to conventional broadcast agreements, comprising:

automatically, and without visibility to an Internet user, obtaining localizing data on an Internet user requesting media content; and determining an appropriate source for distributing a media package, the media package including the requested media content and an appropriate geographic group of advertisements based on the obtained localizing data.

51. The method of claim 50, wherein the method further includes directing the Internet user to an appropriate Internet address for the appropriate media package source.

52. The method of claim 50, wherein the appropriate geographic group of advertisements based on the obtained localizing data includes appropriate geographic advertisements selected from the group consisting of regional retail advertisements, national retail advertisements, and regional informational advertisements.

\* \* \* \* \*